(12) United States Patent
Peyrard et al.

(10) Patent No.: US 11,762,633 B2
(45) Date of Patent: Sep. 19, 2023

(54) CIRCUIT AND METHOD FOR BINARY FLAG DETERMINATION

(71) Applicants: STMicroelectronics (Grenoble 2) SAS, Grenoble (FR); STMicroelectronics (Rousset) SAS, Rousset (FR)

(72) Inventors: Rene Peyrard, Voiron (FR); Fabrice Romain, Rians (FR)

(73) Assignees: STMicroelectronics (Grenoble 2) SAS, Grenoble (FR); STMicroelectronics (Rousset) SAS, Rousset (FR)

(*) Notice: Subject to any disclaimer, the term of this patent is extended or adjusted under 35 U.S.C. 154(b) by 288 days.

(21) Appl. No.: 17/039,353

(22) Filed: Sep. 30, 2020

(65) Prior Publication Data

US 2021/0109714 A1  Apr. 15, 2021

(30) Foreign Application Priority Data

Oct. 11, 2019 (FR) ...................................... 1911345

(51) Int. Cl.
*G06F 7/76* (2006.01)
*G06F 7/48* (2006.01)
*G06F 7/499* (2006.01)

(52) U.S. Cl.
CPC ............ *G06F 7/764* (2013.01); *G06F 7/4824* (2013.01); *G06F 7/49942* (2013.01)

(58) Field of Classification Search
CPC .... G06F 7/764; G06F 7/4824; G06F 7/49942; G06F 2207/7233–7247; G06F 21/00; G06F 21/60; G06F 7/57–575; G06F 7/02–026; G06F 7/50–5095; H04L 9/002; H04L 9/003; H04L 2209/036; H04L 2209/046; H04L 2209/04; H04L 2209/12
See application file for complete search history.

(56) References Cited

U.S. PATENT DOCUMENTS

| | | |
|---|---|---|
| 7,334,133 B2 | 2/2008 | Goubin |
| 2004/0254966 A1 | 12/2004 | Sunwoo et al. |
| 2005/0198474 A1 | 9/2005 | Nancekievill et al. |
| 2007/0071235 A1 | 3/2007 | Fujisaki et al. |
| 2008/0040414 A1 | 2/2008 | Kuenemund |
| 2008/0126456 A1 | 5/2008 | Kuenemund |
| 2009/0112896 A1 | 4/2009 | Golic |
| 2010/0235417 A1 | 9/2010 | Baek |
| 2010/0281092 A1 | 11/2010 | Kuenemund |

(Continued)

FOREIGN PATENT DOCUMENTS

WO  WO-2019046651 A2 * 3/2019  ........... G06F 17/147

OTHER PUBLICATIONS

Patterson et al., "Computer Organization and Design: The Hardware/Software Interface", Fifth Edition, Chapter 2.4 pp. 73-79, 2014. Retrieved from <https://ict.iitk.ac.in/wp-content/uploads/CS422-Computer-Architecture-ComputerOrganizationAndDesign5th-Edition2014.pdf> (Year: 2014).*

(Continued)

*Primary Examiner* — Matthew D Sandifer
*Assistant Examiner* — Carlo Waje
(74) *Attorney, Agent, or Firm* — Slater Matsil, LLP

(57) ABSTRACT

The present disclosure relates to a circuit and method for determining a sign indicator bit of a binary datum including a step for processing of the binary datum masked with a masking operation, and not including any processing step of the binary datum.

21 Claims, 2 Drawing Sheets

(56) References Cited

U.S. PATENT DOCUMENTS

| | | |
|---|---|---|
| 2010/0332578 A1 | 12/2010 | Gopal et al. |
| 2013/0275730 A1 | 10/2013 | Ould-Admed-Vall et al. |
| 2014/0019467 A1 | 1/2014 | Itoh et al. |
| 2014/0379773 A1 | 12/2014 | Rubanovich et al. |
| 2015/0172042 A1 | 6/2015 | Karroumi et al. |
| 2015/0278555 A1 | 10/2015 | Melzani |
| 2019/0050204 A1 | 2/2019 | Hutter et al. |
| 2019/0379529 A1 | 12/2019 | Meyer et al. |
| 2021/0097206 A1* | 4/2021 | Wierzynski ............ G06F 21/72 |
| 2021/0109708 A1 | 4/2021 | Peyrard et al. |
| 2021/0109711 A1 | 4/2021 | Peyrard et al. |
| 2021/0109713 A1 | 4/2021 | Peyrard et al. |
| 2021/0157586 A1 | 5/2021 | Vigilant |
| 2021/0165633 A1 | 6/2021 | Guilley et al. |

OTHER PUBLICATIONS

Mead "Bit Manipulation" Retrieved from <https://azrael.digipen.edu/~mmead/www/Courses/CS225/BitManipulations.html> Retrieved on <Aug. 31, 2022> (Year: 2022).*

Alexander Davronov, "Status register," Wikipedia, May 19, 2019, 4 pages, XP055697044.

Franois Grard, et al., "An Efficient and Provable Masked Implementation of qTESLA", IACR, International Association for Cryptologic Research, Jun. 2, 2019, 21 pages, XP061032793.

Nakatsu Daisuke, et al., "Combination of SW Countermeasure and CPU Modification on FPGA Against Power Analysis", Aug. 24, 2020, International Conference on Financial Cryptography and Data Security, 15 pages, XP047428751.

Bache, F., et al., "SPARX—A Side-Channel Protected Processor for ARX-based Cryptography," IEEE, 2017 Design, Automation and Test in Europe (DATE) Conference & Exhibition, Mar. 27-31, 2017, 6 pages.

Goubin, L., "A Sound Method for Switching Between Boolean and Arithmetic Masking," CHES 2001,13 pages, © Springer-Verlag Berlin Heidelberg 2001.

Gross, H., et al., "Concealing Secrets in Embedded Processors Designs," 15th Smart Card Research and Advanced Application Conference—CARDIS 2016, Nov. 7-9, 2016, 16 pages.

Mulder, E., et al., "Invited: Protecting RISC-V against Side-Channel Attacks," 2019 56th ACM/IEEE Design Automation Conference (DAC), Jun. 2-6, 2019, 4 pages.

Patterson, David A., et al., "Computer Organization and Design: The Hardware/Software Interface", Elsevier Inc., 5th Edition, https://ict.iitk.ac.in/wp-content/uploads/CS422-Computer-Architecture-ComputerOrganizationAnd Design, Sep. 26, 2013, Digital 2014, 302 pages.

Philippaerts, Pieter et al., "Code Pointer Masking: Hardening Applications against Code Injection Attacks", International Conference on Detection of Intrusions and Malware, and Vulnerability Assessment, Detection of Intrusions and Malware, and Vulnerability Assessment (DIMVA) LNSC, vol. 6739, https://doi.org/10.1007/978-3-642-22424-9_ 12, Jul. 2011, 20 pages.

* cited by examiner

CIRCUIT AND METHOD FOR BINARY FLAG DETERMINATION

CROSS-REFERENCE TO RELATED APPLICATIONS

This application claims the benefit of French Application No. 1911345, filed on Oct. 11, 2019, which application is hereby incorporated herein by reference.

TECHNICAL FIELD

The present disclosure relates generally to electronic systems, circuits and methods, and more specifically to processors and methods. The present disclosure more specifically relates to methods and processors configured to process masked data.

BACKGROUND

The present disclosure relates generally to electronic systems, circuits and methods, and more specifically to processors and methods. The present disclosure more specifically relates to methods and processors configured to process masked data.

SUMMARY

There is a need in the art for more reliable processors.

There is a need in the art for processors configured to process masked data.

There is a need in the art for processors configured to process masked data without implementing unmasking operations of these data.

One embodiment addresses all or some of the drawbacks of known processors.

One embodiment provides a method for determining a sign indicator bit of a binary datum including a step for processing of the binary datum masked with a masking operation, and not including any processing step of the binary datum.

According to one embodiment, the datum is not unmasked during the determination.

According to one embodiment, the datum is negative if its most significant bit is equal to "1."

According to one embodiment, the masked datum is masked by adding a mask to the datum to be masked.

According to one embodiment, the sign indicator bit is equal to "1" when the following condition is met:

$$(H\_M + CH\_M * 2^n) \geq (MH + 2^{n-1})$$

wherein:
H_M is the masked datum;
"+" represents the addition operation;
CH_M is a carry digit that may appear during the masking operation of the masked datum H_M;
MH is the mask; and
n is the number of bits in the masked datum and the mask.

According to one embodiment, the carry digit is equal to "1" when the following condition is met:

$$H\_M < MH$$

otherwise, the carry digit is equal to "0."

Another embodiment provides a circuit configured to carry out the method described above.

According to one embodiment, the circuit comprises a comparator.

BRIEF DESCRIPTION OF THE DRAWINGS

The foregoing features and advantages, as well as others, will be described in detail in the following description of specific embodiments given by way of illustration and not limitation with reference to the accompanying drawings, in which.

DETAILED DESCRIPTION OF ILLUSTRATIVE EMBODIMENTS

Like features have been designated by like references in the various figures. In particular, the structural and/or functional features that are common among the various embodiments may have the same references and may dispose identical structural, dimensional and material properties.

For the sake of clarity, only the operations and elements that are useful for an understanding of the embodiments described herein have been illustrated and described in detail. The complete operation of a processor will not be disclosed here, the embodiments disclosed below being compatible with most of the typical operating methods of a processor.

Unless indicated otherwise, when reference is made to two elements connected together, this signifies a direct connection without any intermediate elements other than conductors, and when reference is made to two elements coupled together, this signifies that these two elements can be connected or they can be coupled via one or more other elements.

In the following disclosure, unless indicated otherwise, when reference is made to absolute positional qualifiers, such as the terms "front", "back", "top", "bottom", "left", "right", etc., or to relative positional qualifiers, such as the terms "above", "below", "higher", "lower", etc., or to qualifiers of orientation, such as "horizontal", "vertical", etc., reference is made to the orientation shown in the figures.

Unless specified otherwise, the expressions "around", "approximately", "substantially" and "in the order of" signify within 10%, and preferably within 5%.

In the remainder of the disclosure, the data are binary data, that is to say, each datum corresponds to a binary word comprising at least one bit, preferably more than one bit.

Figure 1:
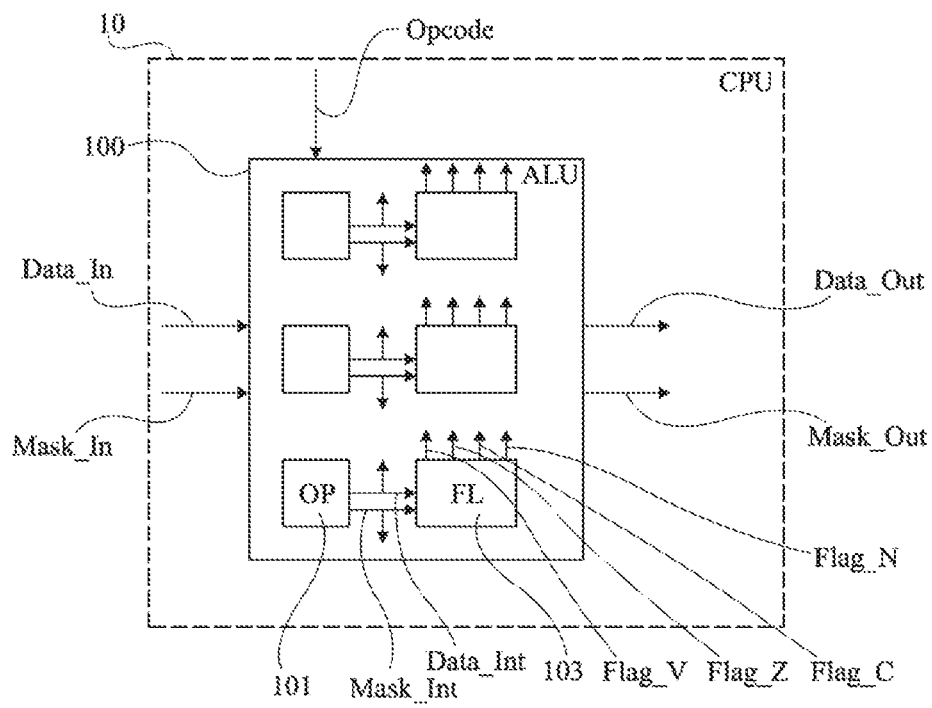
FIG. 1 shows, schematically and in block diagram form, part of an architecture of a processor.

FIG. 1 shows, schematically and in block diagram form, part of an architecture of one embodiment of a processor 10 (CPU).

The processor 10 is a processor configured to process masked data and their masks. The processor 10 comprises an arithmetic and logic unit 100 (ALU) that is also configured to process the masked data and their masks. More specifically, the processor 100 receives masked input data Data_In, and their masks Mask_In, as input, and supplies masked output data Data_Out, and their masks Mask_Out, as output.

The input data Data_In, respectively the output data Data_Out, are masked with the masks Mask_In, respectively Mask_Out, by implementing masking of the arithmetic type. Arithmetic masking is, in the case described here, additive masking in which the mask is added to the datum to be masked. The mask and the datum to be masked are binary words of equal size. More specifically, a masked datum A_M is given by the following formula:

$$A\_M = (A + MA) \bmod 2^n$$

wherein:
A represents the datum to be masked;
MA represents the mask;
"+" represents the addition operation;
"mod" represents the modulo operation; and
n is the number of bits that makes up the datum to be masked A, the mask MA and the masked datum A_M.

The unit 100 is configured to further receive an operating code Opcode explaining the processing to be applied to pairs each comprising a masked input datum Data_In and its mask Mask_In. The operating code Opcode indicates the or set of different operations to be applied to the masked input data Data_In, and their masks Mask_In, in order to obtain the masked output data Data_Out and their masks Mask_Out. An operating code is more specifically a set of instructions defining the or the set of arithmetic and/or logic operations to be applied to the input data Data_In and their masks Mask_In.

In order to implement these operating codes, the unit 100 comprises one or several, preferably several, circuits 101 (OP) configured to carry out various arithmetic or logic operations. The circuits 101 are configured to be selected and used as a function of the set of instructions defined by the operating code Opcode received by the unit 100. As an example, the circuits 101 are configured to carry out arithmetic operations such as an addition, a multiplication, a complementary calculation, etc., and/or logic operations such as the AND operation, the OR operation, the EXCLUSIVE OR (XOR) operation, etc. Several circuits 101 can be implemented in parallel or in series in order to execute the operating code Opcode. Each circuit 101 is thus configured to receive masked input data Data_In, and their masks Mask_In, and/or intermediate masked output data Data_Int, and their masks Mask_Int, corresponding to output data, and their masks, of other circuits 101.

The unit 100 further comprises circuits 103 (FL) for generating indicator bits, or flag bits. Each circuit 103 is coupled to one of the circuits 101. The circuit 103 is configured to receive, as input, the masked data received, as input, by the circuits 101, and their masks, and the data supplied, as output, by the circuits 101, and their masks. Thus, in the example disclosed in relation with FIG. 1, the circuit 103 is configured to receive masked data Data_In, and their masks Mask_In (not shown in FIG. 1), and intermediate output data Data_Int, and their masks Mask_Int. The circuit 103 supplies indicator bits as output. More specifically, the circuits 103 are configured to supply:
a sign indicator bit Flag_N;
a carry digit indicator bit Flag_C;
an indicator bit of a nil value Flag_Z; and
an overflow indicator bit Flag_V.

According to one variant, certain parts of the circuits 103 of the unit 100 can be shared by several circuits 101.

The sign indicator bit Flag_N is a bit equal to "1" when the datum from which it is calculated is a negative number, and equal to "0" otherwise. One exemplary circuit configured to calculate the indicator bit Flag_N is disclosed in relation with FIG. 2.

The carry digit indicator bit Flag_C is a bit equal to "1" when the datum from which it is calculated comprises a carry digit, and equal to "0" otherwise. One exemplary circuit configured to calculate the indicator bit Flag_N is disclosed in relation with FIG. 3.

The indicator bit of a nil value Flag_Z is a bit equal to "1" when the datum from which it is calculated is equal to zero, and equal to "0" otherwise.

The overflow indicator bit Flag_V is a bit equal to "1" when the datum from which it is calculated represents a number too large to be represented by the number of bits of the datum from which it was calculated, and equal to "0" otherwise.

According to one embodiment, the indicator bits Flag_N, Flag_C, Flag_Z and Flag_V are generated each time the circuit 101 is used. According to one variant, only some of the indicator bits Flag_N, Flag_C, Flag_Z and Flag_V are generated for several uses of the circuit 101 or for another type of circuit 101.

Figure 2:
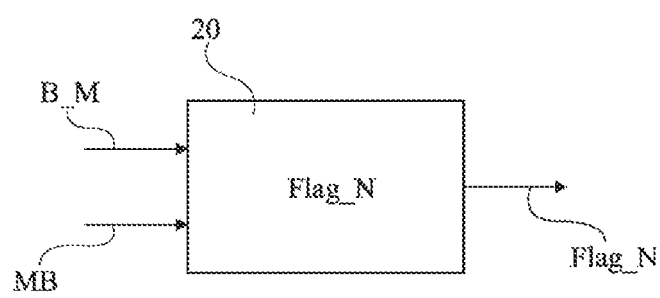
FIG. 2 shows, schematically and in block diagram form, an embodiment of a circuit of the processor of FIG. 1.

FIG. 2 shows, schematically and in block diagram form, an embodiment of a circuit 20 (Flag_N) configured to calculate the sign indicator bit Flag_N disclosed in relation with FIG. 1.

The circuit 20 receives, as input, a masked datum B_M and its mask MB, the datum B_M being obtained from a datum B. The datum B_M and the mask MB are binary words comprising n bits, n being a natural integer. The following notation will be used hereinafter:
P[m; k] designates the set of bits going from rank k to rank m of a binary word P, m and k being natural integers less than or equal to n; and
P[m] designates the bit with rank m of the binary word P.

As disclosed in relation with FIG. 1, the sign indicator bit Flag_N is a bit equal to "1" when the datum from which it is calculated, that is to say the datum B here, represents a negative number, and is equal to "0" otherwise. By convention, the most significant bit of a binary word representing a negative number is equal to "1." According to one embodiment, the masked datum B_M is negative when the following condition is met:

$$(B\_M[n-1;0] + CB\_M * 2^n) \geq (MB[n-1;0] + 2^{n-1})$$

wherein CB_M represents the carry digit that may appear during the masking operation leading to the masked datum B_M.

The carry digit CB_M is equal to "1" when the following condition is met, otherwise it is equal to "0":

$$B\_M[n-1;0] < MB[n-1;0]$$

One advantage of the circuit disclosed in relation with FIG. 2 is that it makes it possible to provide the sign indicator bit Flag_N of a masked datum without having to unmask the datum.

Figure 3:
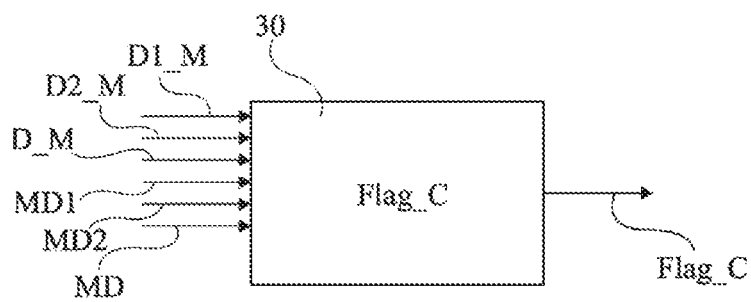
FIG. 3 shows, schematically and in block diagram form, an embodiment of another circuit of the processor of FIG. 1.

FIG. 3 shows, schematically and in block diagram form, an embodiment of a circuit 30 (Flag_C) configured to calculate the carry digit indicator bit Flag_C disclosed in relation with FIG. 1.

The circuit 30 is a circuit more specifically belonging to a circuit 103, disclosed in relation with FIG. 1, associated with a circuit 101 carrying out an addition operation between two masked data. More specifically, an output datum D_M and it is mask MD of the circuit 101 are given by the following formulas:

$$\begin{cases} D\_M = (D1\_M + D2\_M) \bmod 2^n \\ MD = (MD1 + MD2) \bmod 2^n \end{cases}$$

wherein:
D1_M and D2_M represent two data D1 and D2 after a masking operations; and
MD1 and MD2 represent the masks of the masked data D1_M and D2_M.

As disclosed in relation with FIG. 1, the carry digit indicator bit Flag_C is a bit equal to "1" when the datum from which it is calculated comprises a carry digit, and equal to "0" otherwise. The carry digit indicator bit Flag_C is more specifically given by the following equivalent formulas:

Flag_C=CD1_M xor CD2_M xor CADD_D_M xor CADD_MD xor CD_MD

Flag_C=CD1_M+CD2_M+CADD_D_M-CADD_MD-CD_M wherein:
xor represents the EXCLUSIVE OR logic operation;
CD1_M represents the carry digit that may appear during the additive masking operation leading to the masked datum D1_M with the mask MD1;
CD2_M represents the carry digit that may appear during the additive masking operation leading to the masked datum D2_M with the mask MD2;
CADD_D_M represents the carry digit that may appear during the addition operation between the two masked data D1_M and D2_M;
CADD_MD represents the carry digit that may appear during the addition operation between the two masks MD1 and MD2; and
CD_M represents the carry digit that may appear during the additive masking operation leading to the masked datum D_M with the mask MD.

The carry digits CD1_M, CD2_M and CD_M are obtained by comparing, with its mask, the masked datum with which they are each associated, in the same manner that the carry digit CB_M is obtained as disclosed in relation with FIG. 2.

The carry digit CADD_D_M is equal to "1" when the following condition is met:

$D\_M[n-1;0]<(D1\_M[n-1;0]+D2\_M[n-1;0]) \bmod 2^n$

The carry digit CADD_D_M is equal to "0" otherwise. The carry digit CADD_D_M is also the bit of rank n resulting from the addition of the binary words D1_M[n−1;0] and D2_M[n−1;0].

The carry digit CADD_MD is equal to "1" when the following condition is met:

$MD[n-1;0]<(MD1[n-1;0]+MD2[n-1;0]) \bmod 2^n$

The carry digit CADD_MD is equal to "0" otherwise. The carry digit CADD_MD is also the bit of rank n resulting from the addition of the binary words MD1[n−1;0] and MD2[n−1;0].

One advantage of the circuit 30 disclosed in relation with FIG. 3 is that it does not use any unmasking operation of the masked data D_M, D1_M and D2_M to calculate the carry digit indicator bit Flag_C.

Figure 4:
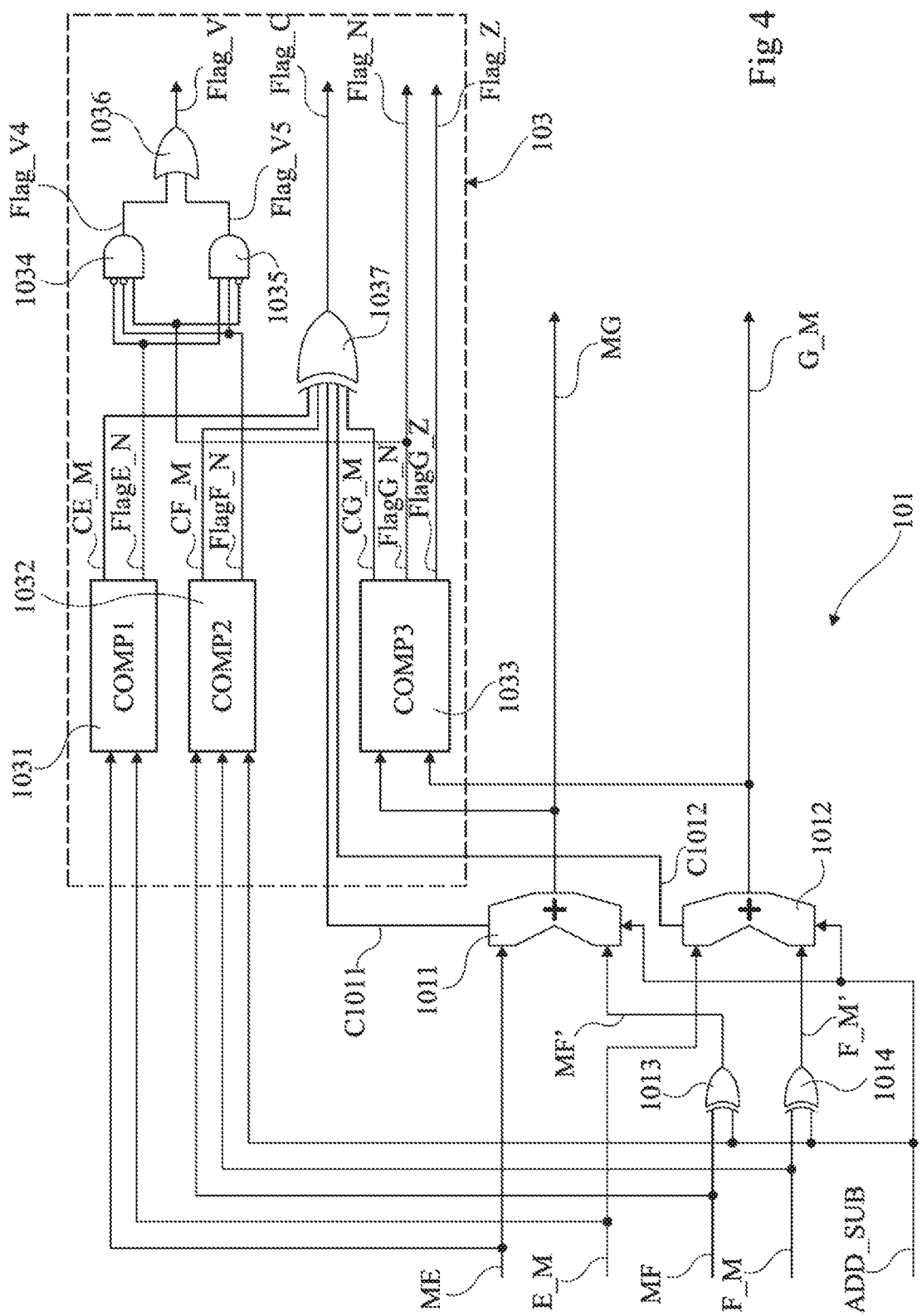
FIG. 4 shows, schematically and in block diagram form, a detailed example of an embodiment of a processor of FIG. 1.

FIG. 4 shows, schematically and in block diagram form, a more detailed example of an embodiment of a circuit 103 associated with a circuit 101.

The circuit 101 is a circuit configured to carry out an addition or subtraction operation between two masked data E_M and F_M, and their masks ME and MF, to provide, as output, a masked datum G_M and its mask MG. The masked data E_M, respectively F_M, G_M, are the result of an additive masking of a datum E, respectively F, G, with the mask ME, respectively MF, MG. In the case of addition, the masked datum G_M and its mask MG are given by the following formulas (A):

$$\begin{cases} G\_M = (E\_M + F\_M) \bmod 2^n \\ MG = (ME + MF) \bmod 2^n \end{cases} \quad (A)$$

In the case of subtraction, the masked datum G_M and its mask MG are given by the following formulas (B):

$$\begin{cases} G\_M = (E\_M + F\_M) \bmod 2^n = (E\_M + !F\_M + 1) \bmod 2^n \\ MG = (ME - MF) \bmod 2^n = (ME + !MF + 1) \bmod 2^n \end{cases} \quad (B)$$

wherein !X designates the complementary to 1 of a binary word X.

The circuit 101 comprises two adder circuits 1011 and 1012, and two inverter circuits 1013 and 1014. As an example, the inverter circuits 1013 and 1014 are EXCLUSIVE OR logic circuits used as inverters in the case of a subtraction operation, or as followers in the case of an addition operation.

The bitwise addition circuit ion is a circuit comprising at least three inputs and at least two outputs. The circuit ion receives, as input, the mask ME, a mask MF' modified from the mask M, and operation information ADD_SUB. As an example, the operation information ADD_SUB is equal to "0" in the case of addition and "1" in the case of subtraction. The circuit 1011 provides, as output, the mask MG and a carry digit C1011.

The addition circuit 1012 is a circuit comprising at least three inputs and at least two outputs. The circuit 1012 receives, as input, the masked datum E_M, a masked datum F_M' modified from the masked datum F_M, and the operation information ADD_SUB. The circuit 1012 provides, as output, the mask MG and a carry digit C1012.

The inverter circuit 1013 makes it possible to modify the mask MF to the mask MF' as a function of the operation information ADD_SUB.

The inverter circuit 1014 makes it possible to modify the masked datum F_M to the masked datum F_M' as a function of the operation information ADD_SUB.

The operation of the circuit 101 is as follows. The operation information ADD_SUB is equal to "0" when an addition operation is requested, and equal to "1" when a subtraction operation is requested.

When an addition operation is requested, the inverter circuits 1013 and 1014 see operation information ADD_SUB equal to "0" that indicates to them that they are not asked to reverse the datum that they receive as input. The circuits 1013 and 1014 then supply, as output, the mask MF' equal to the mask MF, and the masked datum F_M' equal to the masked datum F_M. The adder circuits 1011 and 1012 and the data that they receive as input, and then supply, as output, the mask MG and the masked datum G_M according to the formulas (A) given above.

When a subtraction operation is requested, the inverter circuits 1013 and 1014 see operation information ADD_SUB equal to "1" that indicates to them that the calculation of the complementary of the datum that they receive as input is requested. The circuits 1013 and 1014 then supply, as output, the mask MF' equal to the mask MF, and the masked datum F_M' equal to the masked datum F_M. The adder circuits 1011 and 1012 and the data that they receive as input, and then supply, as output, the mask MG and the masked datum G_M according to the formulas (B) given above.

The circuit 103 is adapted to supply the indicator bits Flag_V, Flag_C, Flag_N and Flag_Z disclosed in relation with FIG. 1. The circuit 103 receives, as input:
- the mask ME;
- the masked datum E_M;
- the mask MF;
- the masked datum F_M;
- the operation information ADD_SUB;
- the carry digit C1011 coming from the adder circuit 1011;
- the carry digit C1012 coming from the adder circuit 1012;
- the mask MG; and
- the masked datum G_M.

The circuit 103 comprises:
- three comparator circuits 1031 (COMP1), 1032 (COMP2) and 1033 (COMP3);
- two circuits 1034 and 1035 implementing a logic gate of the AND type;
- one circuit 1036 implementing a logic gate of the OR type; and
- one circuit 1037 implementing a logic gate of the EXCLUSIVE OR type.

The comparator circuit 1031 receives, as input, the mask ME and the masked datum E_M, and supplies, as output, a binary word CE_M representing the carry digit that may appear during the masking operation leading to the masked datum E_M. Additionally, the comparator circuit 1031 supplies, as output, a sign indicator bit FlagE_N indicating the sign of the datum E corresponding to the masked datum E_M unmasked with the mask ME.

The comparator circuit 1032 receives, as input, the mask MF, the masked datum F_M, and the operation information ADD_SUB, and supplies, as output, a binary word CF_M representing the carryover digit that may appear during the masking operation leading to the masked datum F_M in the case of an addition, and representing the inverse of the carryover digit that may appear during the masking operation leading to the masked datum F_M in the case of a subtraction. Additionally, the comparator circuit 1032 supplies, as output, a sign indicator bit FlagF_N indicating the sign of the datum F corresponding to the masked datum F_M unmasked with the mask MF in the case of an addition, or the inverse of the sign of F in the case of a subtraction.

The comparator circuit 1033 receives, as input, the mask MG and the masked datum G_M, and supplies, as output, a binary word CG_M representing the carry digit that may appear during the masking operation leading to the masked datum G_M. Additionally, the comparator circuit 1033 supplies, as output, a sign indicator bit FlagG_N indicating the sign of the datum G corresponding to the masked datum G_M unmasked with the mask MG, and an indicator bit of a nil value FlagG_Z indicating whether the datum G is equal to zero. The sign indicator bit Flag_N is equal to the indicator bit FlagG_N. The indicator bit of a nil value Flag_Z is equal to the indicator bit FlagG_Z.

The circuit 1034 is a circuit implementing a logic gate of the AND type comprising one non-inverter input and two inverter inputs. The circuit 1034 receives, as input, on its non-inverter input, the sign indicator bit FlagG_N, and on its two inverter inputs, the sign indicator bit FlagE_N and the sign indicator bit FlagG_N. The circuit 1034 provides, as output, a datum Flag_V4.

The circuit 1035 is a circuit implementing a logic gate of the AND type comprising two non-inverter inputs and one inverter input. The circuit 1034 receives, as input, on its non-inverter inputs, the sign indicator bit FlagE_N and the sign indicator bit FlagF_N, and on its inverter input, the sign indicator bit FlagG_N. The circuit 1035 provides, as output, a datum Flag_V5.

The circuit 1036 is a circuit implementing an OR logic gate comprising two inputs. The circuit 1036 receives the outputs of the circuits 1035 and 1036 as input, that is to say, the data Flag_V4 and FlagV5. The circuit 1036 provides, as output, the overflow indicator bit Flag_V.

The circuit 1037 is a circuit implementing a logic gate of the EXCLUSIVE OR type comprising five non-inverter inputs. The circuit 1037 receives, as input, the carry digit CE_M, the carry digit CG_M, the carry digit C1011 and the carry digit C1012. The circuit 1037 provides, as output, the carry digit indicator bit Flag_C.

One advantage of the circuit 103 disclosed in relation with FIG. 4 is that it does not use unmasking operations to calculate the indicator bits Flag_V, Flag_C, Flag_N and Flag_Z.

Various embodiments and variants have been described. Those skilled in the art will understand that certain features of these embodiments can be combined and other variants will readily occur to those skilled in the art.

Finally, the practical implementation of the embodiments and variants described herein is within the capabilities of those skilled in the art based on the functional description provided hereinabove.

What is claimed is:

1. A method comprising:
   receiving, by a first EXCLUSIVE OR logic gate in an arithmetic and logic unit (ALU) circuit, a second masked binary datum and an add/subtract operation information;
   generating, by the first EXCLUSIVE OR logic gate, a first intermediate output;
   receiving, by a second EXCLUSIVE OR logic gate in the ALU circuit, a second mask for the second masked binary datum, and the add/subtract operation information;
   generating, by the second EXCLUSIVE OR logic gate, a second intermediate output;
   receiving, by a first adder circuit in the ALU circuit, the first intermediate output, a first masked binary datum, and the add/subtract operation information;
   adding to or subtracting from the first masked binary datum, by the first adder circuit in the ALU circuit, the second masked binary datum to generate an output masked binary datum, in accordance with the add/subtract operation information;
   receiving, by a second adder circuit in the ALU circuit, the second intermediate output, a first mask, and the add/subtract operation information;
   adding to or subtracting from the first mask, by the second adder circuit in the ALU circuit, the second mask to generate an output mask, in accordance with the add/subtract operation information;
   receiving, by a comparator circuit in the ALU, the output masked binary datum and the output mask; and
   comparing, by the comparator circuit in the ALU circuit, the output masked binary datum and the output mask to determine a sign indicator bit of an output unmasked binary datum of the output masked binary datum, without any processing of the output unmasked binary datum itself.

2. The method according to claim 1, wherein the output masked binary datum is kept masked during the comparing.

3. The method according to claim 1, wherein the output unmasked binary datum is negative in accordance with its most significant bit being equal to "1."

4. The method according to claim 1, wherein the output masked binary datum is masked by adding the output mask to the output unmasked binary datum.

5. The method according to claim 4, wherein the sign indicator bit is equal to "1" in accordance with the following condition being met:

$$(H\_M+CH\_M*2^n) \geq (MH+2^{n-1})$$

where:
H_M is the output masked binary datum;
"+" represents an addition operation;
CH_M is a carry digit that may appear during a masking operation of the output masked binary datum H_M;
MH is the output mask; and
n is a number of bits in the output masked binary datum and the output mask.

6. The method according to claim 5, wherein the carry digit is equal to "1" in accordance with the following condition is met:

$$H\_M < MH.$$

7. The method according to claim 5, wherein the carry digit is equal to "0" in accordance with the following condition not being met:

$$H\_M < MH.$$

8. An arithmetic and logic unit (ALU) circuit comprising:
an add/subtract circuit to comprising:
a first EXCLUSIVE OR logic gate configured to receive a second masked binary datum, and an add/subtract operation information, and generate a first intermediate output;
a second EXCLUSIVE OR logic gate configured to receive a second mask for the second masked binary datum, and the add/subtract operation information, and generate a second intermediate output;
a first adder circuit coupled to the first EXCLUSIVE OR logic gate, and configured to receive the first intermediate output, a first masked binary datum, and the add/subtract operation information, and generate an output masked binary datum representing the second masked binary datum added to or subtracted from the first masked binary datum, in accordance with the add/subtract operation information; and
a second adder circuit coupled to the second EXCLUSIVE OR logic gate, and configured to receive the second intermediate output, a first mask, and the add/subtract operation information, and generate an output mask representing the second mask added to or subtracted from the first mask, in accordance with the add/subtract operation information; and
a comparator circuit coupled to the first and second adder circuits, and configured to compare the output masked binary datum and the output mask to determine a sign indicator bit of an output unmasked binary datum of the output masked binary datum, without any processing of the output unmasked binary datum itself.

9. The ALU circuit according to claim 8, wherein the output masked binary datum is kept masked during the comparison.

10. The ALU circuit according to claim 8, wherein the output unmasked binary datum is negative in accordance with its most significant bit being equal to "1."

11. The ALU circuit according to claim 8, wherein the output masked binary datum is masked by adding the output mask to the output unmasked binary datum.

12. The ALU circuit according to claim 11, wherein the sign indicator bit is equal to "1" in accordance with the following condition being met:

$$(H\_M+CH\_M*2^n) \geq (MH+2^{n-1})$$

where:
H_M is the output masked binary datum;
"+" represents an addition operation;
CH_M is a carry digit that may appear during a masking operation of the output masked binary datum H_M;
MH is the output mask; and
n is a number of bits in the output masked binary datum and the output mask.

13. The ALU circuit according to claim 12, wherein the carry digit is equal to "1" in accordance with the following condition is met:

$$H\_M < MH.$$

14. The ALU circuit according to claim 12, wherein the carry digit is equal to "0" in accordance with the following condition not being met:

$$H\_M < MH.$$

15. A processor comprising:
an arithmetic and logic unit (ALU) circuit comprising:
an add/subtract circuit to comprising:
a first EXCLUSIVE OR logic gate configured to receive a second masked binary datum, and an add/subtract operation information, and generate a first intermediate output;
a second EXCLUSIVE OR logic gate configured to receive a second mask for the second masked binary datum, and the add/subtract operation information, and generate a second intermediate output;
a first adder circuit coupled to the first EXCLUSIVE OR logic gate, and configured to receive the first intermediate output, a first masked binary datum, and the add/subtract operation information, and generate an output masked binary datum representing the second masked binary datum added to or subtracted from the first masked binary datum, and an output masked binary datum carry digit, in accordance with the add/subtract operation information; and
a second adder circuit coupled to the second EXCLUSIVE OR logic gate, and configured to receive the second intermediate output, a first mask, and the add/subtract operation information, and generate an output mask representing the second mask added to or subtracted from the first mask, and an output mask carry digit, in accordance with the add/subtract operation information;
a first comparator circuit coupled to the first and second adder circuits, and configured to compare the output masked binary datum and the output mask to determine a sign indicator bit of an output unmasked binary datum of the output masked binary datum, without any processing of the output unmasked binary datum itself; and
second and third comparator circuits, wherein the first, second and third comparator circuits are configured to process the first masked binary datum, the first mask for the first masked binary datum, the second masked binary datum, the second mask for the second masked binary datum, the add/subtract operation information, the output masked binary datum, the output mask, the output masked binary datum carry digit, and the output mask carry digit to generate a carry digit indicator bit, a nil value indicator bit, and an overflow indicator bit.

16. The processor according to claim 15, wherein the output masked binary datum is kept masked during the comparison.

17. The processor according to claim 15, wherein the output unmasked binary datum is negative in accordance with its most significant bit being equal to "1."

18. The processor according to claim 15, wherein the output masked binary datum is masked by adding the output mask to the output unmasked binary datum.

19. The processor according to claim 18, wherein the sign indicator bit is equal to "1" in accordance with the following condition being met:

$$(H\_M + CH\_M * 2^n) \geq (MH + 2^{n-1})$$

where:
- $H\_M$ is the output masked binary datum;
- "+" represents an addition operation;
- $CH\_M$ is a first carry digit that may appear during a masking operation of the output masked binary datum $H\_M$;
- $MH$ is the output mask; and
- $n$ is a number of bits in the output masked binary datum and the output mask.

20. The processor according to claim 19, wherein the first carry digit is equal to "1" in accordance with the following condition is met:

$$H\_M < MH.$$

21. The processor according to claim 19, wherein the first carry digit is equal to "0" in accordance with the following condition not being met:

$$H\_M < MH.$$

* * * * *

UNITED STATES PATENT AND TRADEMARK OFFICE
CERTIFICATE OF CORRECTION

| | | |
|---|---|---|
| PATENT NO. | : 11,762,633 B2 | Page 1 of 1 |
| APPLICATION NO. | : 17/039353 | |
| DATED | : September 19, 2023 | |
| INVENTOR(S) | : Peyrard et al. | |

It is certified that error appears in the above-identified patent and that said Letters Patent is hereby corrected as shown below:

In the Claims

In Column 9, in Claim 8, Line 31, after "circuit" delete "to".

In Column 10, in Claim 15, Line 30, after "circuit" delete "to".

Signed and Sealed this
Nineteenth Day of December, 2023

*Katherine Kelly Vidal*

Katherine Kelly Vidal
*Director of the United States Patent and Trademark Office*